(12) United States Patent
Inami et al.

(10) Patent No.: US 11,437,009 B2
(45) Date of Patent: Sep. 6, 2022

(54) METHOD FOR PRODUCING METAL STRUCTURE

(71) Applicant: TOYOTA JIDOSHA KABUSHIKI KAISHA, Toyota (JP)

(72) Inventors: Norio Inami, Susono (JP); Go Murasawa, Yonezawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 415 days.

(21) Appl. No.: 16/573,060

(22) Filed: Sep. 17, 2019

(65) Prior Publication Data
US 2020/0143783 A1 May 7, 2020

(30) Foreign Application Priority Data

Nov. 2, 2018 (JP) .............................. JP2018-207542

(51) Int. Cl.
C09D 7/61 (2018.01)
G10K 11/165 (2006.01)
C08K 3/013 (2018.01)

(52) U.S. Cl.
CPC ............ *G10K 11/165* (2013.01); *C08K 3/013* (2018.01); *C09D 7/61* (2018.01)

(58) Field of Classification Search
CPC . G10K 11/165; B22F 1/16; B22F 3/11; B22F 1/0003; B22F 3/02; B22F 3/10; C08K 3/013; C09D 7/61; C22C 1/1084
USPC ........................................................ 264/109
See application file for complete search history.

(56) References Cited

FOREIGN PATENT DOCUMENTS

| JP | 08-277175 A | 10/1996 |
| JP | 2006-335611 | 12/2006 |
| JP | 2006-335918 | 12/2006 |

OTHER PUBLICATIONS

Machine Translation of JP 2006-335611. (Year: 2006).*
Japan Society of Mechanical Engineers, Jan. 2014 (2014), vol. 117, No. 1142, p. 54.
"Damping Performance of Micro Bell-shape Metal Composite," Lecture Proceedings of the 48th Symposium on Stress and Strain Measurement and Strength Evaluation, Jan. 2017, Japanese Society for Non-Destructive Inspection, pp. 17-18.

* cited by examiner

*Primary Examiner* — Hannah J Pak
(74) *Attorney, Agent, or Firm* — Finnegan, Henderson, Farabow, Garrett & Dunner, LLP

(57) ABSTRACT

The present disclosure provides a method for producing a metal structure having holes dispersed in a matrix and having inorganic particles disposed inside the holes, that are capable of moving in the holes independently of the matrix, the method making it possible to increase the proportion of inorganic particles in the metal structure that are capable of moving in the holes independently of the matrix. In the method for producing a metal structure whereby inorganic particles are disposed inside holes dispersed in a matrix so as to be capable of moving independently of the matrix, the hollow particles covering the inorganic particles which are distributed in the matrix of the metal structure are fragmented so that the inorganic particles are disposed inside the holes formed by fragmenting the hollow particles.

7 Claims, 3 Drawing Sheets

METHOD FOR PRODUCING METAL STRUCTURE

FIELD

The present disclosure relates to a method for producing a metal structure.

BACKGROUND

One type of material known to have excellent soundproof qualities is a metal structure having holes dispersed in a matrix, and with inorganic particles disposed inside the holes, the particles being able to move within the holes independently of the matrix. Part of the vibrational energy of sound waves passing through the metal structure is converted to kinetic energy of the inorganic particles disposed in the holes, finally ending up as thermal energy. Since a metal structure of this type can decrease the vibrational energy of passing sound waves, it has excellent sound absorption properties, sound insulating properties and soundproof quality.

PTL 1 discloses a bell-shaped capsule structure made of a material having such a metal structure, and a method for producing it, for the purpose of forming a metal structure as mentioned above having inorganic particles capable of moving independently of the matrix, disposed inside the holes of the matrix. In the method disclosed in the same publication, first a core-shell structure is formed in such a manner that the sinter shrinkage factor of the core section is larger than the sinter shrinkage factor of the shell section, and the core-shell structure is sintered to produce a bell-shaped capsule structure wherein the core inside the hole of the shell can move independently of the shell.

PTL 2 discloses a coating composition containing inorganic fine particles having a foaming agent covering the surfaces, and a resin. In the method disclosed in the same publication, the foaming agent is foamed after coating and drying the coating composition on an object, to form a structure having inorganic particles capable of moving independently from the coating film, disposed inside the holes of the matrix of the coating film.

NPL 1 discloses a method of producing such a type of metal structure. In the method disclosed in the same publication, hollow micro glass capsules and white metal are placed in a crucible, and they are heated to melting. The hollow micro glass capsules and white metal are then kneaded at 240 to 250° C. and air-cooled to solidification to form white metal particles covered with numerous hollow micro glass capsules. The white metal particles covered with numerous hollow micro glass capsules are subsequently placed in a crucible together with the white metal for the matrix and melted at 400° C., and then kneaded and solidified. This method produces a metal structure having white metal particles in holes, distributed in a diffuse manner in the white metal serving as the matrix.

NPL 2 also discloses a method of producing a similar type of metal structure. In this publication, first an aluminosilicon alloy is placed in a crucible and heated to melting. The melted aluminosilicon alloy is then mixed with hollow micro glass capsules and solidified by air-cooling. This forms aluminosilicon alloy particles covered with hollow micro glass capsules. The aluminosilicon alloy particles covered with hollow micro glass capsules are subsequently placed in a crucible together with the white metal for the matrix and melted at 400° C., and then kneaded and solidified. This produces a metal structure having aluminosilicon alloy particles in holes, distributed in a diffuse manner in a white metal serving as the matrix.

CITATION LIST

Patent Literature

[PTL 1] Japanese Unexamined Patent Publication No. 2006-335611
[PTL 2] Japanese Unexamined Patent Publication No. 2006-335918

Non Patent Literature

[NPL 1] Japan Society of Mechanical Engineers, 2014.1, Vol. 117, No. 1142, p. 54.
[NPL 2] Lecture Proceedings of the 48th Symposium on Stress and Strain Measurement and Strength Evaluation, January, 2017, Japanese Society for Non-Destructive Inspection

SUMMARY

Technical Problem

It is an object of the present disclosure to provide a method for efficient production of a metal structure wherein holes are dispersed in a matrix, and inorganic particles are disposed inside the holes and are capable of moving in the holes independently of the matrix.

The present inventors have found that with the metal structures obtained by both the method of the present disclosure and conventional methods such as those of NPLs 1 and 2, whereby such metal structures are produced, it is often the case that some of the hollow particles covering the inorganic particles fail to melt, and as a result they can remain without being absorbed into the matrix, or remain in the metal structure without being fragmented.

When hollow particles remain, the inorganic particles may be less able to move independently from the matrix, due to the hollow particles present between the metal structure and the matrix. In other words, remaining hollow particles can impair the performance of the metal structure, such as the sound absorption properties, sound insulating properties and soundproof quality.

The present inventors therefore considered that the performance of a metal structure can be improved if it is possible to decrease the number of hollow particles remaining in the metal structure and to increase the proportion of inorganic particles capable of moving in the holes independently of the matrix.

Therefore, another object of the present disclosure is to provide a method for producing a metal structure having holes dispersed in a matrix and having inorganic particles disposed inside the holes that are capable of moving in the holes independently of the matrix, the method making it possible to increase the proportion of inorganic particles in the metal structure that are capable of moving in the holes independently of the matrix.

Solution to Problem

The present inventors have found that the aforementioned object can be achieved by the following means.

<Aspect 1>

A method for producing a metal structure having a matrix and inorganic particles dispersed in the matrix, with the inorganic particles being covered with hollow particles, and/or being disposed inside holes dispersed in the matrix so as to be capable of moving independently of the matrix, wherein the method includes:

drying a first slurry obtained by kneading the hollow particles, the inorganic particles and a dispersing medium, to obtain inorganic particles covered with the hollow particles, providing a mixture comprising the inorganic particles covered with the hollow particles and a metal powder, and heating the mixture, thereby melting or sintering the metal powder to form the matrix, so that the inorganic particles are distributed in the matrix while being covered by the hollow particles and/or being capable of moving independently of the matrix inside the holes dispersed in the matrix.

<Aspect 2>

The method according to aspect 1, wherein the inorganic particles, the hollow particles and a dispersing medium, with the mass ratio of the inorganic particles with respect to the hollow particles being 4:1 to 16:1 and the mass ratio of the total of the inorganic particles and the hollow particles with respect to the dispersing medium being 5:1 to 17:1, are kneaded with a rotary kneader for 60 seconds or longer at a rotational speed of 100 rpm or less, to obtain the first slurry.

<Aspect 3>

The method according to aspect 1 or 2, wherein the mixture is obtained as a second slurry comprising the inorganic particles covered with the hollow particles, the metal powder and a dispersing medium, or as a powder obtained by drying the second slurry.

<Aspect 4>

The method according to aspect 3, wherein the inorganic particles covered with the hollow particles, the metal powder and a dispersing medium, with the volume ratio of the inorganic particles covered with the hollow particles with respect to the metal powder being 3:7 to 1:9 and the proportion of dispersing medium with respect to the second slurry being 28 mass % to 30 mass %, are kneaded with a planetary centrifugal kneader for 10 seconds to 40 seconds or longer at a rotational speed of 700 rpm or less, to obtain the second slurry.

<Aspect 5>

A method for producing a metal structure whereby inorganic particles are disposed inside holes dispersed in a matrix so as to be capable of moving independently of the matrix, wherein the method provides a metal structure in which the inorganic particles covered with hollow particles are distributed in the matrix, and the method includes fragmenting the hollow particles covering the inorganic particles so that the inorganic particles are disposed inside the holes formed by fragmenting the hollow particles.

<Aspect 6>

The method according to aspect 5, wherein fragmentation of the hollow particles is carried out by deforming the matrix, applying vibration to the matrix, or a combination thereof.

<Aspect 7>

The method according to aspect 6 wherein the deformation of the matrix is carried out by compressing the matrix.

<Aspect 8>

The method according to any one of aspects 1 to 7, wherein the inorganic particles are selected from the group consisting of metals, metalloids, combinations thereof, and their oxides, nitrides, carbides and borides.

<Aspect 9>

The method according to any one of aspects 1 to 8, wherein the inorganic particles are selected from the group consisting of aluminum silicon alloy particles, zirconia particles, tungsten carbide particles, titanium alloy particles, and combinations thereof.

<Aspect 10>

The method according to any one of aspects 1 to 9, wherein the hollow particles are glass microcapsules, ceramic microcapsules, or a combination thereof.

Advantageous Effects of Invention

According to the present disclosure it is possible to provide a method for more efficient production of a metal structure wherein holes are dispersed in a matrix, and inorganic particles are disposed inside the holes and are capable of moving in the holes independently of the matrix. According to the disclosure it is also possible to provide a method for producing a metal structure having holes dispersed in a matrix, and having inorganic particles disposed inside the holes that are capable of moving in the holes independently of the matrix, the method making it possible to increase the proportion of inorganic particles in the metal structure that are capable of moving in the holes independently of the matrix.

DESCRIPTION OF EMBODIMENTS

Embodiments of the disclosure will now be explained in detail. The disclosure is not limited to the embodiments described below, however, and various modifications may be implemented within the scope of the gist thereof.

<Method 1 of the Disclosure>

One method of the disclosure is a method for producing a metal structure having a matrix and inorganic particles dispersed in the matrix, wherein the inorganic particles are covered with hollow particles and/or are disposed inside holes dispersed in the matrix so as to be capable of moving independently of the matrix. One method of the disclosure also includes drying a first slurry obtained by kneading hollow particles, inorganic particles and a dispersing medium, to obtain inorganic particles covered with the hollow particles, providing a mixture comprising inorganic particles covered with hollow particles and a metal powder, and heating the mixture, thereby melting or sintering the metal powder to form a matrix, so that the inorganic particles are distributed in the matrix while being covered by the hollow particles and/or being capable of moving independently of the matrix inside the holes dispersed in the matrix.

In method 1 of the disclosure, when the mixture obtained by mixing the inorganic particles covered with hollow particles and the metal powder is melted or sintered, the hollow particles fuse during the process, being absorbed and/or being fragmented in the matrix to form holes in the matrix, and the inorganic particles become disposed inside the holes in a state such that they are capable of moving independently of the matrix.

<Step of Providing Inorganic Particles Covered with Hollow Particles>

(Inorganic Particles Covered with Hollow Particles)

Figure 1:
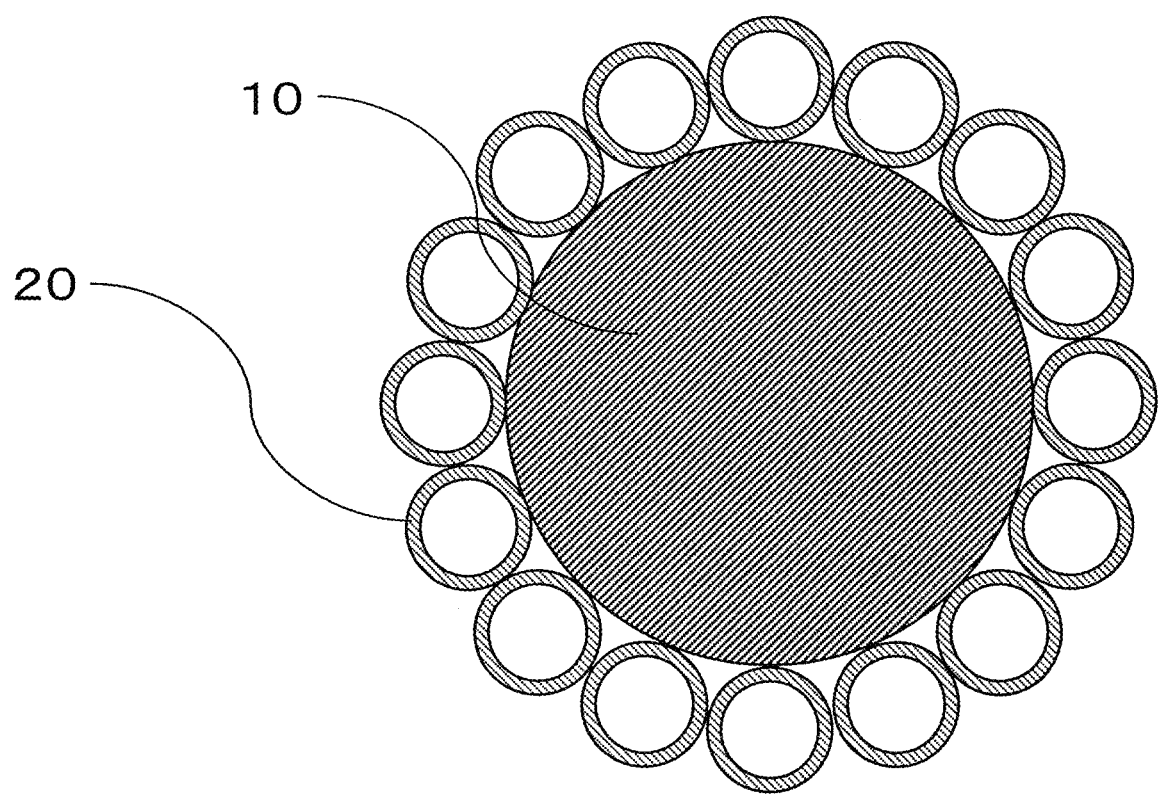
FIG. 1 is a cross-sectional view of an inorganic particle covered with hollow particles, to be used in one method of the disclosure.

The inorganic particles covered with hollow particles, which are produced by the step of providing inorganic particles covered with hollow particles, have the structure shown in FIG. 1.

FIG. 1 is a cross-sectional view of an inorganic particle covered with hollow particles, to be used in method 1 of the disclosure. In FIG. 1 the inorganic particle 10 is covered by the hollow particles 20. The hollow particles 20 cover the entirety of the inorganic particle 10.

The inorganic particles covered with hollow particles can be obtained, for example, by drying a first slurry obtained by kneading hollow particles, inorganic particles and a dispersing medium. The first slurry may also include a binder.

The dispersing medium referred to here may be an alcohol. An example of an alcohol is ethanol. When ethanol is used as the dispersing medium, the ethanol may also serve as the binder.

The ratio of the inorganic particles and the hollow particles in the first slurry is not particularly restricted so long as it is a sufficient ratio for the hollow particles to cover the inorganic particles. The ratio of the inorganic particles to the hollow particles is preferably 4:1 to 16:1, as the mass ratio. The ratio of the inorganic particles and hollow particles may also be 4:1 to 16:1, 6:1 to 13:1, 8:1 to 11:1 or 9:1 to 10:1.

If the inorganic particles and hollow particles are present in this ratio in the first slurry, the inorganic particles covered with hollow particles will more readily adopt a structure with one inorganic particle covered by multiple hollow particles.

The total of the inorganic particles and hollow particles in the first slurry is preferably in a mass ratio of 5:1 to 17:1 with respect to the dispersing medium. If the dispersing medium in the first slurry is present in this ratio, the inorganic particles covered with hollow particles will form more easily in the first slurry during kneading.

The total of the inorganic particles and hollow particles in the first slurry may be in a mass ratio of 5:1 to 17:1, 7:1 to 15:1, 9:1 to 13:1 or 10:1 to 11:1 with respect to the dispersing medium.

When the amount of dispersing medium in the first slurry is low, the hollow particles and inorganic particles cannot be thoroughly dispersed in the first slurry, tending to cause formation of masses of the hollow particles and inorganic particles and resulting in poor efficiency. Conversely, if the amount of dispersing medium in the first slurry is too high, the hollow particles and inorganic particles will become overly dispersed, hampering formation of the inorganic particles covered with hollow particles.

Kneading of the hollow particles, inorganic particles and dispersing medium is preferably carried out with a rotary kneader, for example. This is because a rotary kneader has low shearing force and is thus less likely to cause fragmentation of the hollow particles during kneading.

When a rotary kneader is used, the rotational speed of the kneading apparatus is preferably 130 rpm or less, 120 rpm or less, 100 rpm or less or 80 rpm or less. The rotational speed of the kneading apparatus is also preferably 10 rpm or more, 30 rpm or more, 50 rpm or more or 70 rpm or more.

A rotational speed within this range will facilitate formation of the inorganic particles covered with hollow particles. If the rotational speed is too high, the slurry will tend to stick to the inner wall of the pan of the kneading apparatus, resulting in poor efficiency for formation of the inorganic particles covered with hollow particles.

When a rotary kneader is used, the kneading time is preferably 30 seconds or longer, 45 seconds or longer, 60 seconds or longer or 90 seconds or longer. A short kneading time may result in insufficient formation of the inorganic particles covered with hollow particles.

The kneading time is also preferably no longer than 150 seconds, no longer than 120 seconds or no longer than 100 seconds. A longer kneading time is associated with poor production efficiency.

<Step of Providing Mixture>

One method of the disclosure includes providing a mixture in which the inorganic particles covered with hollow particles and the metal powder are mixed.

(Mixture of Inorganic Particles Covered with Hollow Particles and Metal Powder)

The mixture of the inorganic particles covered with the hollow particles and the metal powder may be obtained as a second slurry containing the inorganic particles covered with the hollow particles, the metal powder and a dispersing medium, or as a powder obtained by drying the second slurry.

The dispersing medium in the second slurry may be an alcohol. An example of an alcohol is ethanol.

The ratio of the inorganic particles covered with hollow particles and the metal powder in the second slurry may be adjusted depending on the desired abundance ratio of the inorganic particles covered with hollow particles in the matrix of the metal structure and/or of the inorganic particles disposed in the holes formed when the hollow particles are fragmented.

The second slurry may include the inorganic particles covered with hollow particles and the metal powder in a volume ratio of 3:7 to 1:9, 1:3 to 1:8 or 1:4 to 1:5.

The dispersing medium in the second slurry is preferably included at 25 mass % or greater, 27 mass % or greater, 28 mass % or greater or 29 mass % or greater with respect to the second slurry. The dispersing medium in the second slurry is also included at 35 mass % or less, 33 mass % or less, 32 mass % or less or 30 mass % or less with respect to the second slurry.

If the dispersing medium in the second slurry is present in this ratio, the inorganic particles covered with hollow particles and the metal powder will disperse more uniformly in the second slurry during kneading.

If the amount of dispersing medium in the second slurry is low, it will not be possible to thoroughly disperse the inorganic particles covered with hollow particles and the metal powder in the second slurry, and masses of the inorganic particles covered with hollow particles and the metal powder will tend to form, making it difficult to uniformly mix the inorganic particles covered with hollow particles and the metal powder.

If the amount of dispersing medium in the second slurry is too high, conversely, the inorganic particles covered with hollow particles will float at the top and separate from the metal powder, also making it difficult to uniformly mix the inorganic particles covered with hollow particles and the metal powder.

Kneading of the inorganic particles covered with hollow particles, the metal powder and the dispersing medium is preferably carried out with a planetary centrifugal kneader, for example. This is because a planetary centrifugal kneader has low shearing force and is thus less likely to cause fragmentation of the hollow particles during kneading.

When a planetary centrifugal kneader is used, the rotational speed of the kneading apparatus is preferably 100 rpm or more, 300 rpm or more, 400 rpm or more or 500 rpm or more. It is also preferably 1000 rpm or less, 900 rpm or less, 700 rpm or less or 600 rpm or less. An excessively high rotational speed can potentially degrade and damage the inorganic particles covered with hollow particles.

In this case, the rotational speed of the kneading apparatus during formation of the second slurry is the revolving speed of the kneading apparatus. The rotational speed is preferably 1.2 to 2.5 times of the revolving speed. The rotational speed may be 1.2 times or more, 1.5 times or more or 1.7 times or more, and 2.5 times or less, 2.0 times or less or 1.7 times or less of the revolving speed.

When a planetary centrifugal kneader is used, the kneading time is preferably 5 seconds or longer, 10 seconds or longer, 20 seconds or longer or 25 seconds or longer. The kneading time is also preferably 45 seconds or shorter, 40 seconds or shorter, 35 seconds or shorter or 30 seconds or shorter.

A short kneading time will hamper uniform dispersion of the inorganic particles covered with hollow particles and the metal powder. A longer kneading time, conversely, will result in degradation of the inorganic particles covered with hollow particles into the hollow particles and inorganic particles, and potentially damaging the hollow particles.

When the obtained inorganic particles covered with hollow particles have different particle diameters, they may be sorted to recover the inorganic particles covered with hollow particles, according to their particle diameters.

(Inorganic Particles)

The inorganic particles that may be used for one method of the disclosure are not particularly restricted, and they may be selected from among metals, metalloids and combinations thereof, as well as their oxides, nitrides, carbides and borides, for example. The inorganic particles may be selected from the group consisting of aluminum silicon alloy particles, zirconia particles, tungsten carbide particles, titanium alloy particles, and their combinations.

The particle diameters of the inorganic particles may have a primary particle diameter (median diameter) of 10 µm or greater, 20 µm or greater or 50 µm or greater, and 1000 µm or less, 500 µm or less or 100 µm or less.

The primary particle diameter (median diameter) of the particles can be determined as the number-based primary particle diameter, by directly measuring the unidirectional diameter based on a projected image taken by observation with a scanning electron microscope (SEM), transmission electron microscope (TEM) or the like, and analyzing particle groups composed of 100 or more aggregates.

(Hollow Particles)

The hollow particles, according to the method of the disclosure, cover the inorganic particles. The hollow particles preferably cover the entirety of the inorganic particles, but parts of the inorganic particles may remain uncovered so long as the effect of this method of the disclosure is not inhibited. That is, so long as the inorganic particles are distributed in the matrix inside the metal structure produced by method 1 of the disclosure, in a state covered by the hollow particles and/or in a state capable of moving independently of the matrix inside the holes dispersed in the matrix, portions of the inorganic particles may be uncovered by the hollow particles.

Hollow particles that may be used in one method of the disclosure are particles that are more easily fragmented than the inorganic particles. Examples for the hollow particles include, but are not limited to, glass microcapsules, ceramic microcapsules, and their combinations.

The particle diameters of the hollow particles may have a primary particle diameter (median diameter) of 10 µm or greater, 20 µm or greater or 50 µm or greater, and 1000 µm or less, 500 µm or less or 100 µm or less.

The particle diameter of the hollow particles can be determined by the same method as for determining the particle diameter of the inorganic particles.

(Metal Powder)

For one method of the disclosure, the metal powder is the material of the matrix of the metal structure. Examples for the metal powder include, but are not limited to, aluminum powder and white metal powder.

The particle diameters of the metal powder may have a primary particle diameter (median diameter) of 10 µm or greater, 20 µm or greater or 50 µm or greater, and 1000 µm or less, 500 µm or less or 100 µm or less.

The particle diameter of the metal powder can be determined by the same method as for determining the particle diameter of the inorganic particles.

<Step of Heating Mixture>

Method 1 of the disclosure includes heating the mixture, whereby the metal powder melts or is sintered to form the matrix, so that the inorganic particles are distributed in the matrix in a state covered by the hollow particles and/or capable of moving independently of the matrix inside the holes dispersed in the matrix.

The heating temperature for the mixture is a temperature high enough to allow the metal powder to melt or be sintered to form the matrix. When aluminum powder is used as the metal powder, for example, it may be a temperature of about 660° C., as the melting point of aluminum.

The heating temperature for the mixture is also a temperature low enough so that the inorganic particles covered with hollow particles, and/or the inorganic particles disposed in the holes formed by fragmentation of the hollow particles, are distributed in the matrix. In other words, it is a temperature low enough so that the inorganic particles do not melt.

The temperature may be determined as appropriate by a person skilled in the art, depending on selection of the hollow particles, inorganic particles and metallic particles.

<Method 2 of the Disclosure>

Another method of the disclosure is a method for producing a metal structure whereby inorganic particles are disposed inside holes dispersed in a matrix so as to be capable of moving independently of the matrix, wherein in the metal structure in which the inorganic particles covered with hollow particles are distributed in the matrix, the hollow particles covering the inorganic particles are fragmented so that the inorganic particles are disposed inside the holes formed by fragmenting the hollow particles.

This method may be carried out for a metal structure produced by method 1 of the disclosure, or for a metal structure in which inorganic particles covered with hollow particles are distributed in a matrix, which has been produced by a method other than method 1 of the disclosure.

The metal structure produced by method 1 of the disclosure may include inorganic particles covered with hollow particles inside the metal structure, with some of the hollow particles remaining without fragmentation.

The excellent sound absorption properties, sound insulating properties and soundproof quality of a metal structure having inorganic particles disposed in holes and distributed in a matrix, are due to the fact that the inorganic particles disposed in the holes move independently from the matrix. Specifically, part of the vibrational energy of sound waves passing through the metal structure is converted to kinetic energy of the inorganic particles disposed in the holes, finally ending up as thermal energy, and consequently sound waves passing through the metal structure have lower vibrational energy than before passing through.

Inorganic particles covered with hollow particles in the metal structure are not able to move in holes independently of the matrix. Therefore, the contribution of these inorganic particles to the sound absorption properties, sound insulating properties and soundproof quality of the metal structure is thought to be less than that of inorganic particles that are disposed inside the holes in a manner capable of moving in the holes independently of the matrix.

Method 2 of the disclosure, wherein the hollow particles remaining in the metal structure are fragmented, can increase the number of inorganic particles disposed in the holes, thus improving the sound absorption properties, sound insulating properties and soundproof quality of the metal structure.

The method of fragmenting the hollow particles covering the inorganic particles in the metal structure is not particularly restricted, but it is preferably a method by which the inorganic particles are not fragmented. In order to fragment the hollow particles without fragmenting the inorganic particles, when carrying out method 1 of the disclosure, for example, the hollow particles used may be particles that are more easily fragmented than the inorganic particles.

The fragmentation may be carried out, for example, by deforming the matrix, by applying vibration to the matrix, or by a combination of these.

Deformation of the matrix may be accomplished using a method of reversibly or irreversibly deforming the matrix. Reversible deformation of the matrix is deformation of the matrix within the range of its elastic deformation, for example. An example of deforming the matrix is by compression of the matrix.

Figure 2A:
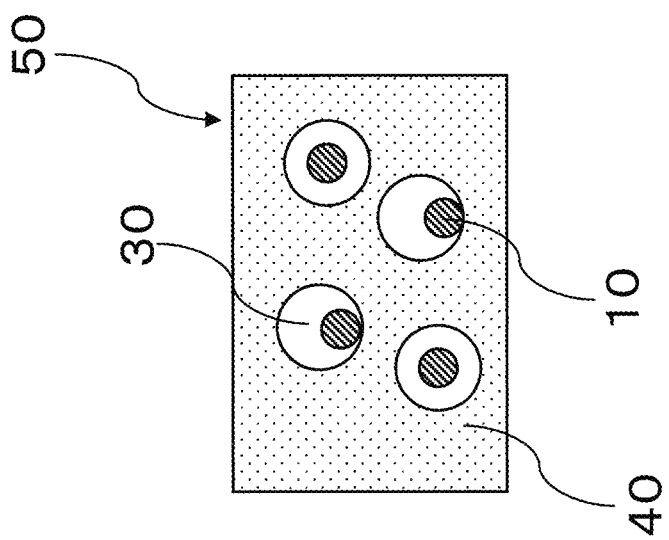
FIG. 2A is a schematic view showing fragmentation of hollow particles covering inorganic particles in a metal structure, by compression of the matrix.
Figure 2B:
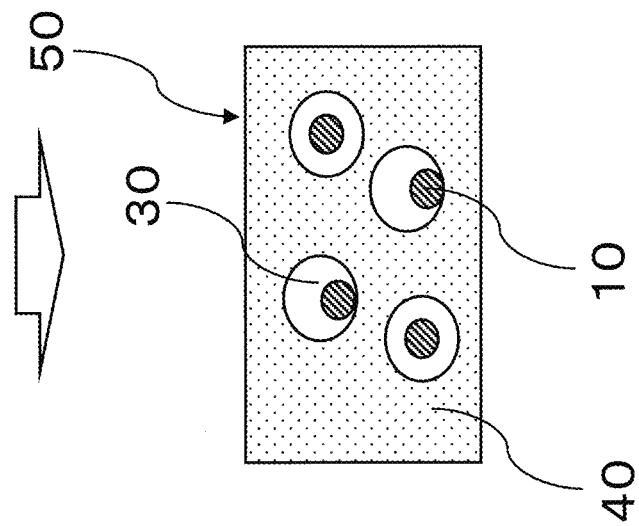
FIG. 2B is a schematic view showing fragmentation of hollow particles covering inorganic particles in a metal structure, by compression of the matrix.
Figure 2C:
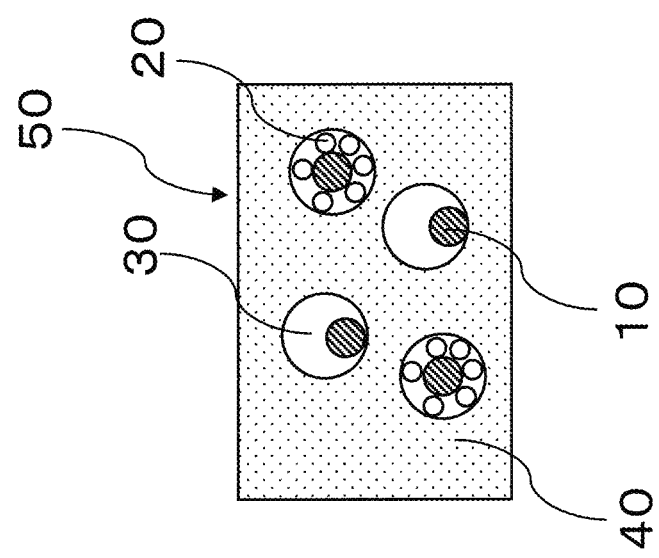
FIG. 2C is a schematic view showing fragmentation of hollow particles covering inorganic particles in a metal structure, by compression of the matrix.

FIGS. 2A to C are schematic views showing fragmentation of hollow particles covering inorganic particles in a metal structure, by compression of the matrix.

FIG. 2A shows a metal structure in which the inorganic particles covered with hollow particles are distributed in the matrix. In FIG. 2A, the metal structure 50 has holes 30 in the matrix 40, with the inorganic particles 10 disposed inside the holes 30. The inorganic particles 10 in the holes 30 of the metal structure 50 include particles that are able to freely move in the holes 30, and particles that are not able to freely move due to coverage by the hollow particles 20.

FIG. 2B shows deformation of the metal structure by compression of the matrix. In FIG. 2B, the arrow at the top of the metal structure 50 indicates that pressure is being applied to the metal structure. The metal structure 50 contracts by being compressed, and the holes 30 deform as a result. Deformation of the holes 30 causes the hollow particles 20 between the matrix 40 and inorganic particles 10 of the metal structure 50 to be fragmented.

FIG. 2C shows the metal structure after the other method of the disclosure has been carried out. In FIG. 2C, the inorganic particles 10 that were unable to freely move due to coverage by the hollow particles 20 have become able to freely move in the holes 30, since the hollow particles 20 present between them and the matrix 40 have been fragmented.

EXAMPLES

Example 1

A metal structure was fabricated according to method 1 of the disclosure. Specifically, the metal structure was fabricated by the following procedure.

Ceramic particles as inorganic particles, glass beads as hollow particles, and ethanol as a dispersing medium, were kneaded in a rotary kneader for 60 seconds at a rotational speed of 100 rpm, to prepare a first slurry. The first slurry was dried to obtain inorganic particles covered with hollow particles.

The mass ratio of the ceramic particles and glass beads in the slurry was 1:1, and the mass ratio between the total of the ceramic particles and glass beads and the dispersing medium was 1:0.3.

Inorganic particles covered with hollow particles, aluminum powder as the metal powder, and ethanol as the dispersing medium were kneaded with a planetary centrifugal kneader for 40 seconds at a rotational speed (revolving speed) of 700 rpm, to obtain a second slurry. The second slurry was dried to obtain a mixture comprising the inorganic particles covered with hollow particles and aluminum powder. The "rotational speed" of the planetary centrifugal kneader refers to the revolving speed. The rotational speed of the planetary centrifugal kneader was 1.7 times the revolving speed.

The volume ratio of the inorganic particles covered with hollow particles and the aluminum powder was 1:4. The proportion of the dispersing medium with respect to the second slurry was 28 to 30 vol %.

The mixture was placed in a die and heated and sintered at about 610° C., and then cooled, to fabricate a metal structure.

Example 2

A metal structure was fabricated according to the other method of the disclosure. Specifically, a metal structure fabricated by the same method as Example 1 was compressed using a pressing machine to cause elastic deformation, reducing the thickness by 0.5% and causing fragmentation of the hollow particles.

Figure 3:
FIG. 3 is a cross-sectional magnified image of the metal structure produced in Example 2.

FIG. 3 is an image of a cross-section of the metal structure of Example 2 as observed under an optical microscope. In FIG. 3, holes 30 with inorganic particles 10 disposed inside them are observed to be dispersed in the matrix 40 of the metal structure. The holes 30 were formed by fragmentation of the hollow particles that were covering the inorganic particles 10.

<Evaluation>

The metal structures of Example 1 and Example 2 were subjected to an acoustic vibration test to evaluate the sound absorption properties, sound insulating properties and soundproof quality. Specifically, vibration of approximately 4000 Hz was applied to the metal structures of Example 1 and Example 2, and the loss factor was measured.

The loss factor was 0.00157 when using the metal structure of Example 1. When using the metal structure of Example 2, however, the loss factor was 0.00304. Thus, the loss factor when using the metal structure of Example 2 was larger than the loss factor when using the metal structure of Example 1.

The reason for the lower loss factor with the metal structure of Example 1 compared to Example 2 is thought to be because some of the inorganic particles disposed in the holes were covered with hollow particles and were therefore unable to freely move.

On the other hand, the reason for the increased loss factor with the metal structure of Example 2 compared to Example 1 is thought to be because the hollow particles fragmented under compression, so that the inorganic particles covered with hollow particles among the inorganic particles disposed in the holes was decreased, thereby increasing the number of inorganic particles capable of moving freely in the holes.

REFERENCE SIGNS LIST

10 Inorganic particle
20 Hollow particles
30 Hole
40 Matrix
50 Metal structure

The invention claimed is:

1. A method for producing a metal structure having a matrix and inorganic particles dispersed in the matrix, with the inorganic particles being covered with hollow particles, and/or being disposed inside holes dispersed in the matrix so as to be capable of moving independently of the matrix, wherein the method includes
    drying a first slurry obtained by kneading the hollow particles, the inorganic particles and a dispersing medium, to obtain inorganic particles covered with the hollow particles,
    providing a mixture comprising the inorganic particles covered with the hollow particles and a metal powder, and
    heating the mixture, thereby melting or sintering the metal powder to form the matrix, so that the inorganic particles are distributed in the matrix while being covered by the hollow particles and/or being capable of moving independently of the matrix inside the holes dispersed in the matrix.

2. The method according to claim 1, wherein
    the inorganic particles, the hollow particles and the dispersing medium,
    with the mass ratio of the inorganic particles with respect to the hollow particles being 4:1 to 16:1 and
    the mass ratio of the total of the inorganic particles and the hollow particles with respect to the dispersing medium being 5:1 to 17:1,
    are kneaded with a rotary kneader for 60 seconds or longer at a rotational speed of 100 rpm or less, to obtain the first slurry.

3. The method according to claim 1, wherein
    the mixture is obtained as a second slurry comprising the inorganic particles covered with the hollow particles, the metal powder and a dispersing medium, or as a powder obtained by drying the second slurry.

4. The method according to claim 3, wherein
    the inorganic particles covered with the hollow particles, the metal powder and a dispersing medium,
    with the volume ratio of the inorganic particles covered with the hollow particles with respect to the metal powder being 3:7 to 1:9 and
    the proportion of dispersing medium with respect to the second slurry being 28 mass % to 30 mass %,
    are kneaded with a planetary centrifugal kneader for 10 seconds to 40 seconds or longer at a rotational speed of 700 rpm or less, to obtain the second slurry.

5. The method according to claim 1, wherein the inorganic particles are selected from the group consisting of metals, metalloids, combinations thereof, and their oxides, nitrides, carbides and borides.

6. The method according to claim 1, wherein the inorganic particles are selected from the group consisting of aluminum silicon alloy particles, zirconia particles, tungsten carbide particles, titanium alloy particles, and combinations thereof.

7. The method according to claim 1, wherein the hollow particles are glass microcapsules, ceramic microcapsules, or a combination thereof.

* * * * *